Patented Nov. 16, 1948

2,453,706

UNITED STATES PATENT OFFICE 2,453,706

CATALYTIC PRODUCTION OF AMIDES

Paul W. Garbo, Freeport, N. Y.

No Drawing. Application April 18, 1947,
Serial No. 742,461

17 Claims. (Cl. 260—295.5)

This application is a continuation-in-part of the copending application, Serial No. 470,817, filed December 31, 1942, now Patent No. 2,419,831, issued April 29, 1947.

This invention relates to the catalytic amidization of pyridine monocarboxylic acids and, more particularly, to the manufacture of nicotinamide.

Nicotinamide, the amide of nicotinic acid or pyridine 3-carboxylic acid, is recognized as an important vitamin product which is prescribed in preference to nicotinic acid because of the latter's undesirable side reactions and physiological effects with certain individuals.

The classical preparation of nicotinamide involves the passage of gaseous ammonia through a molten mass of nicotinic acid at a temperature in the vicinity of 230° C.

Of the other methods of producing nicotinamide known to me, the one proposing the conversion of ammonium nicotinate to nicotinamide has received greatest attention by the workers in this field because, from a theoretical point of view, one might predict it to be the most direct and economical. Basically, this known method involves the formation of ammonium nicotinate, which may be obtained by merely neutralizing nicotinic acid with ammonium hydroxide, and splitting off with the aid of heat a molecule of water from each molecule of ammonium nicotinate to leave a molecule of nicotinamide. However, in the latter step, since ammonium nicotinate is not a very stable compound, heat tends to decompose the nicotinate into the original nicotinic acid and ammonia. Accordingly, this method has led to poor yields of nicotinamide and cumbersome separation and recycling techniques for unconverted material.

Considerable improvement in this process was effected when ammonia gas was bubbled up through the mass of molten ammonium nicotinate undergoing the heat treatment. Thus, by bubbling ammonia through molten ammonium nicotinate at an elevated temperature, e. g., about 160° to 170° C. conversions as high as about 85% were effected. That is to say, the final reaction mass would show by analysis to comprise about 85% nicotinamide and about 15% nicotinic acid as such or as its salt. Even to reach 85% conversion, however, the time of heating and bubbling ammonia ran into many hours. Furthermore, from such a reaction mass, the recovery of nicotinamide in a form meeting present stringent specifications for melting point, color, pH, ash, etc., has required cumbersome, time-consuming and expensive procedures. Also, in view of the high cost of nicotinic acid, it has been necessary to recover, with some difficulty and expense, the unconverted acid for re-use in a subsequent reaction.

Hereinafter the terms, pyridine monocarboxylic acid compound and nicotinic acid compound, are used generically for both the acids and the corresponding ammonium salts.

My invention has as a principal object, the provision of a method for the amidization of pyridine monocarboxylic acid compounds, which is characterized by increased speed of reaction.

A further important object is to produce the amides of pyridine monocarboxylic acids with higher conversions than have been obtained by conventional processes.

These and additional objects of my invention will be apparent from the description which follows.

I have discovered that the conversion of pyridine monocarboxylic acid compounds to the corresponding acid amides by contacting a fluent mass of such a compound with ammonia while at an elevated temperature is accelerated by the presence of a catalyst in the reaction mass. Suitable catalysts are substances containing elements of groups V and VI of the Mendelieff Periodic System and having an atomic number between 15 and 92, inclusive. Representative catalysts are ammonium vanadate, bismuth sulfate, arsenious oxide, tungstic acid and sodium molybdate. Two or more catalysts may be used or the catalyst may be a compound of two or more active elements, e. g., selenium molybdate, ammonium phosphomolybdate and chromic ammonium sulfate. Catalysts containing the element phosphorus, particularly as a phosphate, or molybdenum, particularly as a molybdate, are preferred. Another group of suitable catalysts are substances containing the element boron, such as borax and sodium perborate; advantageously, boron catalysts are used in conjunction with one or more of the aforementioned catalysts either as separate compounds or as a joint compound, e. g., ammonium borotungstate. When the boron catalyst is used as a separate compound, boric acid is preferred. A particularly effective combination of catalysts is boric acid and a molybdate or a phosphate.

The several catalysts vary in their activity in promoting the amidization reaction but in general the amount of catalyst used will be in the range of about 0.1% to about 5.0% of the weight of the entire reaction mass.

The reaction temperature will vary with the particular amide which is to be produced but, in general, it is advisable to maintain the reaction temperature in the range of about 150° to 280° C., and preferably in the range of about 170° to 230° C.

As previously stated, the amidization reaction is conducted by contacting a fluent mass of a pyridine monocarboxylic acid compound with ammonia at a suitable reaction temperature. The fluent condition of the pyridine monocarboxylic acid compound is attained by melting the compound or by dissolving or suspending the compound in an inert liquid, e. g., naphthalene, cyclohexanol or a hydrocarbon fraction, of appropriate boiling point for the reaction temperature to which the inert liquid will be exposed. Alternatively, as disclosed in my copending application, Serial No. 448,414, filed June 25, 1942, now Patent No. 2,427,400, issued September 16, 1947, intimate contact between ammonia and a fluent mass of a pyridine monocarboxylic acid compound may be established by dispersing the compound in the form of fine solid particles or molten droplets in the gaseous ammonia. In all cases, the catalyst should be distributed fairly uniformly throughout the reacting mass. Where the pyridine monocarboxylic acid compound is used in the form of fine solid particles to be dispersed directly in gaseous ammonia or to be suspended in an inert liquid, it is advisable to incorporate the catalyst in the solid particles by impregnating the particles with a liquid containing the catalyst, by adding catalyst dust to the compound while in a molten state, solidifying the mixture and then forming fine particles of the compound containing catalyst, or by other procedures which will occur to those skilled in the art.

The reaction mass including at least one catalyst is maintained in contact with ammonia and at reaction temperature until periodic analyses of the mass indicate that the reaction has reached a satisfactory stage of completion. When the reaction is terminated, the amide product is recovered from the reaction mass by known procedures such as solvent extraction, crystallization from an aqueous solution, etc.

Since the catalysts of this invention accelerate the amidization, a marked decrease in the reaction time is observed. Frequently, the catalyst reduces the reaction time by 20% to 50%; in some cases, the reaction time is decreased to less than one half of the time required in the absence of the catalyst. Acceleration of amidization results often in additional benefits. Many of the amides of pyridine monocarboxylic acids are sensitive to elevated temperatures and continued exposure of these amides to the reaction temperatures at which they are formed tends to decompose or revert some of the produced amides back to the corresponding acids. Accordingly, a condition is encountered where it is impractical to convert to the amide more than a certain percentage of the starting compound; for instance, it is generally not commerically feasible to convert more than about 80% of the starting ammonium nicotinate to nicotinamide. However, through the use of catalysts, it is now possible in some cases to drive the reaction further toward completion. Such higher conversions appear attributable to the catalytic acceleration of the desired amidization reaction and the consequent reduction in reaction time, which latter factor functions to diminish the opportunity for product amide to decompose or revert to the starting compound while the reaction mass is maintained at reaction temperature.

Another benefit of catalysts is that the reaction temperature may be lowered. Temperature reductions of the order of 10° to 25° C. are in several instances possible. Such decreases in reaction temperature also operate to diminish decomposition of the amide product and to facilitate the attainment of desirable high conversions. Obviously, the higher the conversion and the lower the decomposition of the amide product, the simpler and less costly is the recovery of the amide from the reaction mass. Under these circumstances, less unreacted material has to be recycled to the amidization reaction, less material is present to interfere with the separation of the amide in a state of high purity, and in general fewer or simpler recovery operations are necessitated. These additional benefits may be realized through the catalytic process of this invention.

To illustrate the invention further, the following specific examples are given. The proportions are stated as parts by weight.

*Example 1*

A mixture of 200 parts of nicotinic acid, 2 parts of diammonium acid phosphate and 90 parts of 28% ammonia solution is strongly agitated and heated. Water is evaporated from the mixture with continued heating. When the temperature of the mass reaches 175° C., gaseous ammonia is introduced at the bottom of the mass at a rate of about 7 parts per hour. The temperature is maintained in the range of 175° to 180° C. After bubbling the ammonia through the reaction mass for 6 hours, analysis shows that 75% of the starting nicotinic acid has been converted to nicotinamide.

When the foregoing process is repeated with omission of the catalyst, i. e., the diammonium acid phosphate, the bubbling of ammonia through the reaction mass has to be carried on for 11 to 12 hours in order to convert 75% of the starting nicotinic acid to nicotinamide.

*Example 2*

Nicotinic acid (100 parts) is melted by heating to a temperature of 240° C. Ammonium molybdate (0.25 part) and boric acid (1 part) in finely divided form are stirred into the molten acid. Ammonia is then passed through the molten mass at a rate of 6 parts per hour for 2 hours, when the reaction temperature is lowered to about 180° C. and the passage of ammonia through the mass is continued at the rate of 4 parts per hour for another 2 hours. At the end of this period, analysis of the reaction mass reveals that 80% of the original nicotinic acid has been converted to nicotinamide.

Repeating the process of this example without using the catalysts, ammonium molybdate and boric acid, results in a conversion of only 45 to 50% of the nicotinic acid within the specified reaction period.

Benefits similar to those indicated by the foregoing examples are realized when other catalysts of the invention, for instance, phosphomolybdic acid, sodium vanadate or ammonium borotungstate, are used. Under optimum conditions, it is possible with the aid of such catalyst to force the amidization reaction to a conversion level heretofore not attainable.

Other pyridine monocarboxylic acid compounds, e. g., picolinic acid and ammonium quinaldinate, are converted to the corresponding amides when catalytically treated with ammonia under conditions approximating those of the examples hereinabove set forth.

Because the catalysts accelerate the amidization reaction, it becomes commercially feasible to conduct the process on a continuous basis. A particularly attractive form of continuous operation involves, as disclosed in my copending application, Serial No. 448,414, now Patent No. 2,427,400, dated September 16, 1947, passing preheated ammonia in countercurrent relationship through a mass of molten pyridine monocarboxylic acid compound flowing over Raschig rings or similar packing material. In accordance with this invention, a catalyst is dispersed in the molten compound which flows over the packing material in the amidization reactor.

Obviously, many modifications of the basic process of my invention will suggest themselves to those skilled in the art. For example, the operation may be carried out at an elevated pressure and mixtures of two or more compounds may be amidized.

The term, pyridine monocarboxylic acid compounds, as used in this specification and the appended claims, comprehends benzo-pyridine monocarboxylic acid compounds, such as quinaldinic acid and the ammonium salt thereof.

The above description and examples are intended to be illustrative only. Variations of my invention conforming to its spirit are to be considered within the scope of the claims.

What I claim is:

1. The catalytic process for the amidization of pyridine monocarboxylic acid compounds, which comprises reacting a said compound with ammonia in the presence of a catalyst containing an element selected from groups V and VI of the Mendelieff Periodic System and having an atomic number between 15 and 92, inclusive, and recovering thus produced amide from the resulting reaction mass.

2. The catalytic process for the amidization of pyridine monocarboxylic acid compounds, which comprises reacting a said compound with ammonia in the presence of a molybdenum catalyst, and recovering thus produced amide from the resulting reaction mass.

3. The catalytic process for the amidization of pyridine monocarboxylic acid compounds, which comprises reacting a said compound with ammonia in the presence of a phosphorus catalyst, and recovering thus produced amide from the resulting reaction mass.

4. The catalytic process for the amidization of pyridine monocarboxylic acid compounds, which comprises reacting a said compound with ammonia in the presence of a molybdenum catalyst and a boron catalyst, and recovering thus produced amide from the resulting reaction mass.

5. The process of claim 4 wherein the molybdenum catalyst is ammonium molybdate and the boron catalyst is boric acid.

6. The catalytic process for the amidization of pyridine monocarboxylic acid compounds, which comprises reacting a said compound with ammonia in the presence of a boron catalyst, and recovering thus produced amide from the resulting reaction mass.

7. The catalytic process for producing nicotinamide, which comprises reacting a nicotinic acid compound with ammonia in the presence of a catalyst containing an element selected from groups V and VI of the Mendelieff Periodic System and having an atomic number between 15 and 92, inclusive, and recovering thus produced nicotinamide from the resulting reaction mass.

8. The catalytic process for producing nicotinamide, which comprises reacting a nicotinic acid compound with ammonia in the presence of a molybdenum catalyst, and recovering thus produced nicotinamide from the resulting reaction mass.

9. The catalytic process for producing nicotinamide, which comprises reacting a nicotinic acid compound with ammonia in the presence of a phosphorus catalyst, and recovering thus produced nicotinamide from the resulting reaction mass.

10. The catalytic process for producing nicotinamide, which comprises reacting a nicotinic acid compound with ammonia in the presence of a molybdenum catalyst and a boron catalyst, and recovering thus produced nicotinamide from the resulting reaction mass.

11. The process of claim 10 wherein the molybdenum catalyst is ammonia molybdate and the boron catalyst is boric acid.

12. The catalytic process for producing nicotinamide, which comprises reacting a nicotinic acid compound with ammonia in the presence of a boron catalyst, and recovering thus produced nicotinamide from the resulting reaction mass.

13. The catalytic process for the amidization of pyridine monocarboxylic acid compounds, which comprises reacting a said compound with ammonia in the presence of a molybdate as catalyst, while maintaining the reaction temperature in the range of about 150° to about 280° C., and recovering thus produced amide from the resulting reaction mass.

14. The catalytic process for the amidization of pyridine monocarboxylic acid compounds, which comprises reacting a said compound with ammonia in the presence of a phosphate as catalyst, while maintaining the reaction temperature in the range of about 150° to about 280° C., and recovering thus produced amide from the resulting reaction mass.

15. The catalytic process for producing nicotinamide, which comprises reacting a nicotinic acid compound with ammonia in the presence of a molybdate as catalyst, while maintaining the reaction temperature in the range of about 170° to about 230° C., and recovering thus produced nicotinamide from the resulting reaction mass.

16. The catalytic process for producing nicotinamide, which comprises reacting a nicotinic acid compound with ammonia in the presence of a phosphate as catalyst, while maintaining the reaction temperature in the range of about 170° to about 230° C., and recovering thus produced nicotinamide from the resulting reaction mass.

17. The catalytic process for producing nicotinamide, which comprises reacting a nicotinic acid compound with ammonia in the presence of ammonium molybdate and boric acid as catalysts, while maintaining the reaction temperature in the range of about 170° to about 230° C., and recovering thus produced nicotinamide from the resulting reaction mass.

PAUL W. GARBO.

No references cited.